United States Patent
Beeken et al.

(10) Patent No.: US 8,107,359 B2
(45) Date of Patent: Jan. 31, 2012

(54) PERFORMING A CHANGEOVER FROM A FIRST VIRTUAL NODE TO A SECOND VIRTUAL NODE

(75) Inventors: Christopher Barry Beeken, Hants (GB); Stephanie Machleidt, Winchester (GB); Robert Bruce Nicholson, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/303,108

(22) PCT Filed: May 31, 2007

(86) PCT No.: PCT/EP2007/055304
§ 371 (c)(1),
(2), (4) Date: Nov. 16, 2009

(87) PCT Pub. No.: WO2007/141180
PCT Pub. Date: Dec. 13, 2007

(65) Prior Publication Data
US 2010/0054120 A1    Mar. 4, 2010

(30) Foreign Application Priority Data
Jun. 2, 2006   (GB) .................................. 0611038.1

(51) Int. Cl.
*G06F 11/00*   (2006.01)
(52) U.S. Cl. ......................... 370/217; 370/221; 370/225
(58) Field of Classification Search .................. None
See application file for complete search history.

(56) References Cited

U.S. PATENT DOCUMENTS

| | | | |
|---|---|---|---|
| 7,373,542 B2* | 5/2008 | Bragulla et al. | 714/4 |
| 7,423,962 B2* | 9/2008 | Auterinen | 370/216 |

(Continued)

FOREIGN PATENT DOCUMENTS
WO    9959064    11/1999

OTHER PUBLICATIONS

International Preliminary Report on Patent Patentability, for International Application PCT/EP2007/055304, Filed on May 31, 2007, 7 pgs.

(Continued)

*Primary Examiner* — Chi Pham
*Assistant Examiner* — Soon-Dong Hyun
(74) *Attorney, Agent, or Firm* — David W. Victor; Konrad Raynes and Victor LLP

(57) ABSTRACT

Apparatus for non-disruptive error recovery in a clustered system, comprises a node instance configuration activity quiescing component for quiescing configuration activity at a first virtual node instance; a node instance creation component for creating a second virtual node instance with I/O access blocked; a configuration transfer component for transferring configuration data from the first to the second virtual node instance; a commit component for committing the changeover from the first to the second virtual node instance; a node instance communications blocking component for blocking inbound communications to a first virtual node instance; a node instance communications unblocking component for unblocking I/O access at the second virtual node instance; a communication control component for monitoring outbound communications from the first virtual node instance and signalling completion of all pending outbound communications; and a node instance deletion component for deleting the first virtual node instance.

22 Claims, 5 Drawing Sheets

U.S. PATENT DOCUMENTS

| | | | |
|---|---|---|---|
| 7,590,811 B1 * | 9/2009 | Contreras | 711/162 |
| 7,711,977 B2 * | 5/2010 | Ballew et al. | 714/4 |
| 2002/0194523 A1 * | 12/2002 | Ulrich et al. | 714/4 |
| 2003/0018927 A1 | 1/2003 | Gadir et al. | |
| 2004/0199806 A1 * | 10/2004 | Rathunde et al. | 714/4 |
| 2005/0251785 A1 | 11/2005 | Vertes et al. | |
| 2005/0262411 A1 | 11/2005 | Vertes et al. | |
| 2006/0112297 A1 * | 5/2006 | Davidson | 714/2 |

OTHER PUBLICATIONS

International Search Report for International Application PCT/EP2007/055304, filed Dec. 20, 2007, 5 pgs.

Written Opinion of the International Searching Authority, dated Dec. 2, 2008, for International Application No. PCT/EP2007/055304, filed May 31, 2007, 6 pgs.

* cited by examiner

PERFORMING A CHANGEOVER FROM A FIRST VIRTUAL NODE TO A SECOND VIRTUAL NODE

FIELD OF THE INVENTION

The present invention relates to technology for recovering from errors in high-availability clustered software, and especially in a storage network controller.

BACKGROUND OF THE INVENTION

In high-availability clustered software, a number of nodes collaborate to deliver a service to users. High-availability clustering requires the existence of a quantity of replicated state or metadata information that the software uses in order to deliver its features. For correct operation of the product it is critical that this cluster state be internally consistent. By internally consistent we mean that for example different layers in the software have the same count of the number of objects, and the like.

In high-availability clustered software, it is desirable to maintain 100% availability or as close to that target as possible. However, it is possible for software defects to exist in the code. Software error recovery procedures are available for high-availability clustered software. These error recovery procedures allow the cluster to recover if a software failure occurs. The error recovery procedures are designed to ensure that the internal state remains consistent. Unfortunately, software errors can result in inconsistencies in cluster state which can in turn provoke further software failures. These software errors are sometimes only discovered when another failure occurs and this can lead to extensive, and expensive, downtime in production environments. In order to fix these software errors when they occur, fixes are applied to patch the identified error in the cluster state. However, it is not possible to guarantee that there are no further, undiscovered bugs in the cluster state.

In order to guarantee that there are no further inconsistencies as a result of a previous cluster recovery, a reinstall of the storage virtualization software and a re-initialisation of the cluster state to its initial conditions are necessary, but this is a disruptive procedure. One option for a reinstall is to run a Tier 3 recovery procedure (restoration of data from archive storage) which again is disruptive. Another option is to build a new cluster and configure it identically to the original cluster. The data would have to be transferred (by using, for example, host mirroring). In some systems this can be done without stopping I/O. The disadvantage of this solution is that it is expensive: additional hardware is required (twice as many nodes, additional storage) and it requires considerable resource use to migrate to the new cluster. The introduction of new hardware also introduces the risk of hardware faults that potentially compound the problem.

It would thus be desirable to have a technological means for recovering from errors in high-availability clustered software, in a manner which is non-disruptive and which is not dependent on additional hardware and resources in form of systems and storage administrator time and effort.

SUMMARY OF THE INVENTION

The present invention accordingly provides, in a first aspect, an apparatus for non-disruptive error recovery in a clustered system, comprising: a node instance configuration activity quiescing component for quiescing configuration activity at a first virtual node instance; a node instance creation component for creating a second virtual node instance with I/O access blocked; a node instance configuration transfer component for transferring configuration data from said first virtual node instance to said second virtual node instance; a commit component for committing the changeover from said first virtual node instance to said second virtual node instance; a node instance communications blocking component for blocking inbound communications to a first virtual node instance; a node instance communications unblocking component for unblocking I/O access at said second virtual node instance; a communication control component for monitoring outbound communications from said first virtual node instance and signalling completion of all pending outbound communications; and a node instance deletion component for deleting said first virtual node instance.

Preferably, a single director component controls said quiescing component, said node instance creation component, said node instance configuration transfer component, said commit component, said node instance communications blocking component, said node instance communications unblocking component, said communication control component and said node instance deletion component.

Preferably, said single director component is cooperable with one or more filter components to control one or more of said quiescing component, said node instance creation component, said node instance configuration transfer component, said commit component, said node instance communications blocking component, said node instance communications unblocking component, said communication control component and said node instance deletion component.

In a preferred embodiment, a clustered system comprises an apparatus according to the first aspect.

In a preferred embodiment, a storage virtualization system comprises an apparatus according to the first aspect.

In a second aspect, the present invention provides a method or logic arrangement for performing non-disruptive error recovery in a clustered system, comprising the steps of: quiescing configuration activity at a first virtual node instance; creating a second virtual node instance with I/O access blocked; transferring configuration data from said first virtual node instance to said second virtual node instance; committing the changeover from said first virtual node instance to said second virtual node instance; blocking inbound communications to a first virtual node instance; unblocking I/O access at said second virtual node instance; monitoring outbound communications from said first virtual node instance and signalling completion of all pending outbound communications; and deleting said first virtual node instance.

Preferably, a single directing component controls said steps of quiescing, creating, transferring, committing, blocking, unblocking, monitoring, signalling and deleting.

Preferably, said single directing component is cooperable with one or more filter components to control one or more of said steps of quiescing, creating, transferring, committing, blocking, unblocking, monitoring, signalling and deleting.

In a third aspect, there is provided a data carrier having functional data thereon, said functional data comprising functional computer data structures to, when loaded into a computer system and operated upon thereby, enable said computer system to perform all the steps of a method according to the second aspect.

In a fourth aspect, there is provided a computer program comprising computer program code to, when loaded into a computer system and executed thereon, cause said computer system to perform all the steps of a method according to the second aspect.

Preferred embodiments of the invention thus contemplate, in their broadest aspect, a technical framework for recovering from errors in high-availability clustered software.

The preferred embodiment of the invention has the advantage over known systems that it does not require additional hardware (storage virtualization nodes, storage subsystems) and therefore reduces the cost and also the risk of introducing new problems through new hardware. Another advantage is that it does not require host I/O to be stopped. The preferred embodiment is also more efficient than known systems according to the art, as it does not require extra resources in the form of additional storage and system administrator time and effort.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

A preferred embodiment of the present invention is implemented in a storage network having storage virtualization controllers at its nodes.

Figure 1:
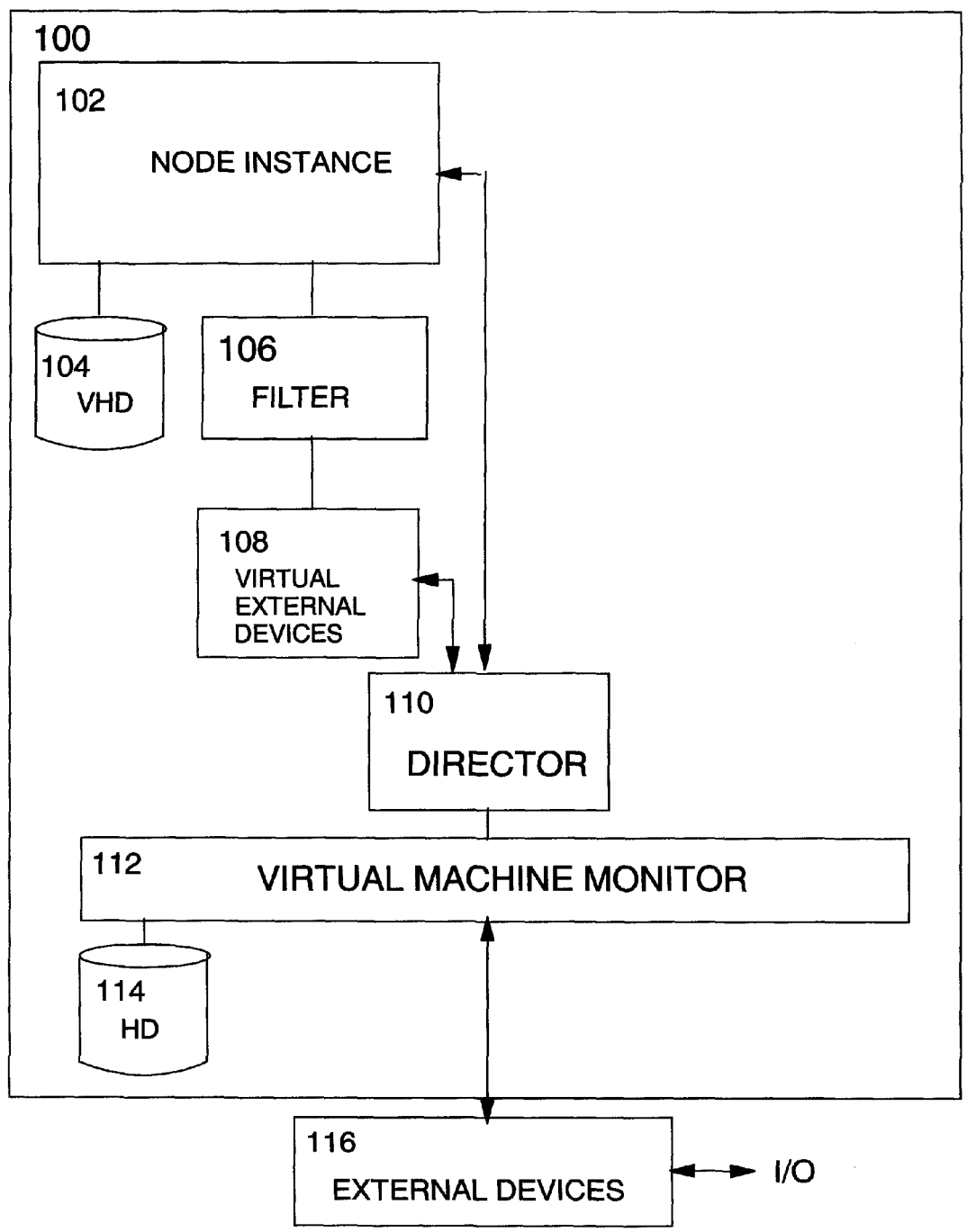
FIGS. 1 to 4 show in schematic form an apparatus, or an arrangement of apparatus, in operation, in accordance with a preferred embodiment of the present invention.

In FIG. 1 is shown an example of a storage area network controller which provides storage virtualization. The diagram shows a single instance of a participating hardware component or arrangement. It will be clear to one of ordinary skill in the art, however, that the various components will be the same for all nodes in a cluster. As is well known to those of ordinary skill in the art, clustering is the use of multiple devices and interconnections to form what is presented externally as a single system.

In FIG. 1, there is shown an arrangement of apparatus 100 comprising a node instance 102, attached to which is a virtual hard disk 104. Node instance 102 is operatively connected to filter 106, which in turn is connected to one or more virtual external devices 108. Node instance 102 and virtual external devices 108 are operatively connected to director 110, which is in communication with virtual machine monitor 112. Virtual machine monitor 112 is connected in conventional fashion to hard disk drive 114 and to one or more external devices 116.

In FIG. 1, node instance 102 (the first virtual machine) runs the storage virtualization node software.

Figure 2:
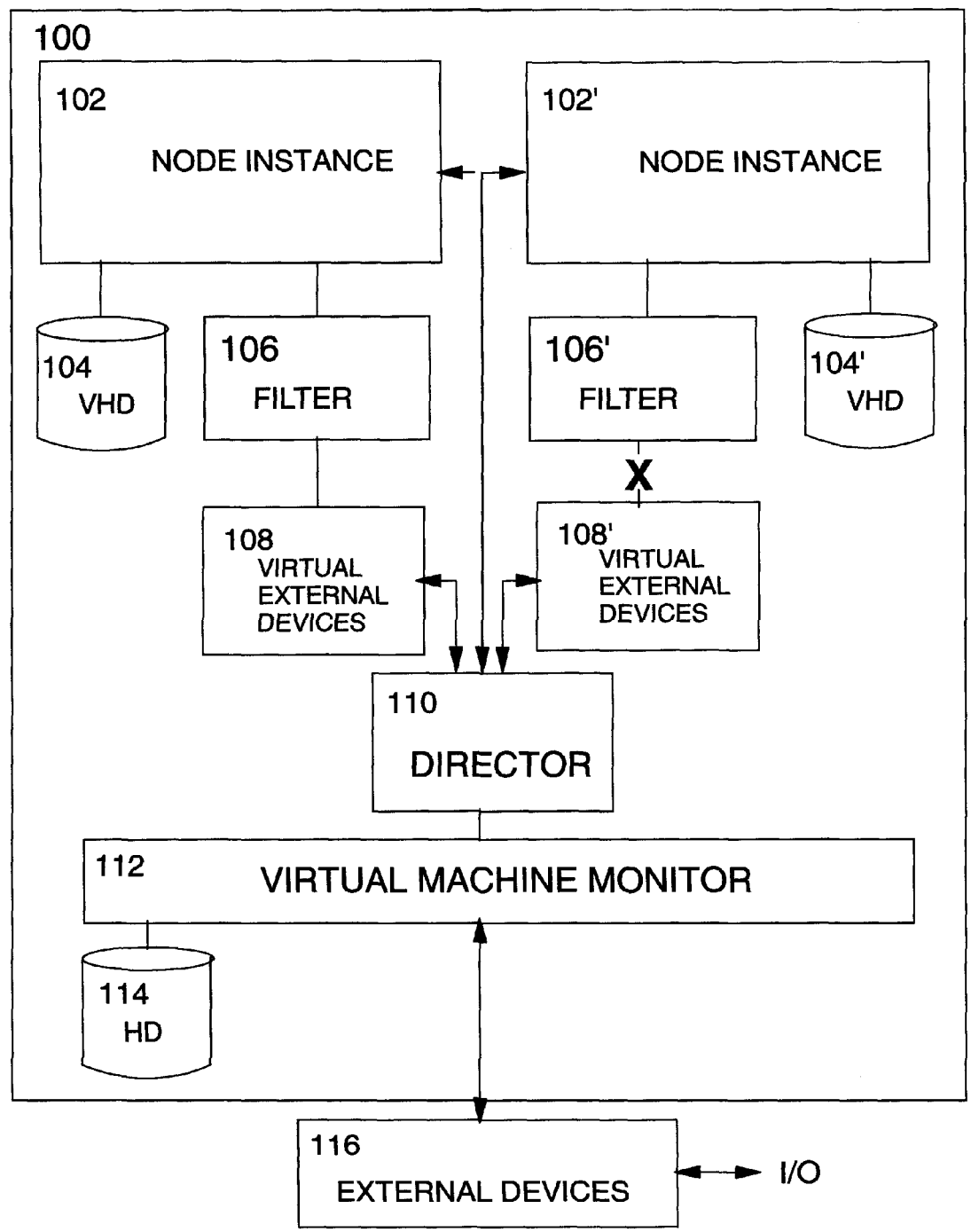

Turning to FIG. 2, there is shown an apparatus comprising all the elements of FIG. 1, and additional elements as follows: node instance 102' is connected to virtual hard disk 104' and to filter 106'. The connection between filter 106' and virtual external devices 108' is disabled. Node instance 102' runs a clean instance of a storage virtualization without event history and contains a clean cluster state.

In operation, Virtual Machine Monitor 112 (VMM) creates and deletes virtual machines (VMs), such as the exemplary node instances 102, 102'. It virtualizes the I/O devices (e.g. ethernet, serial ports, FC adapter) and makes them accessible to all virtual machines; that is, the VMM receives I/O and distributes it correctly to the target virtual machine. It also allows the virtual machines to send I/O. In one embodiment, this could be achieved using a known virtualization technology such as Xen, but alternative virtualization technologies will be evident to one of ordinary skill in the art.

Director 110 is the coordination component to control the creation of virtual machines, the switch-over from the first to the second virtual machine and eventually the deletion of the first virtual machine. It has access to both virtual machines, to their virtual I/O devices and to their virtual hard disks.

Filters 106, 106' define the set of events that a VM can receive and send. During normal 1 operation the set of events is the complete set of possible events for the control application. When the second VM is created at node instance 102', its corresponding filter 106' will allow that subset of the events that is required to configure the control application but not events that define its external view.

There is one active instance of a storage virtualization node, that is, to begin with in the present example, node instance 102. When the VMM receives a request to refresh the storage virtualization cluster state, the VMM initiates the creation of second instance (in the present example, node instance 102'). The director 110 co-ordinates the configuration of the second node instance 102' using the metadata and configuration information from the first node instance 102. The filter of the second instance 106' ensures that no customer I/O passes through. Access to all virtual external devices is disabled. Where necessary the director 110 provides a false interface to these external devices (e.g. a false UPS).

Figure 3:
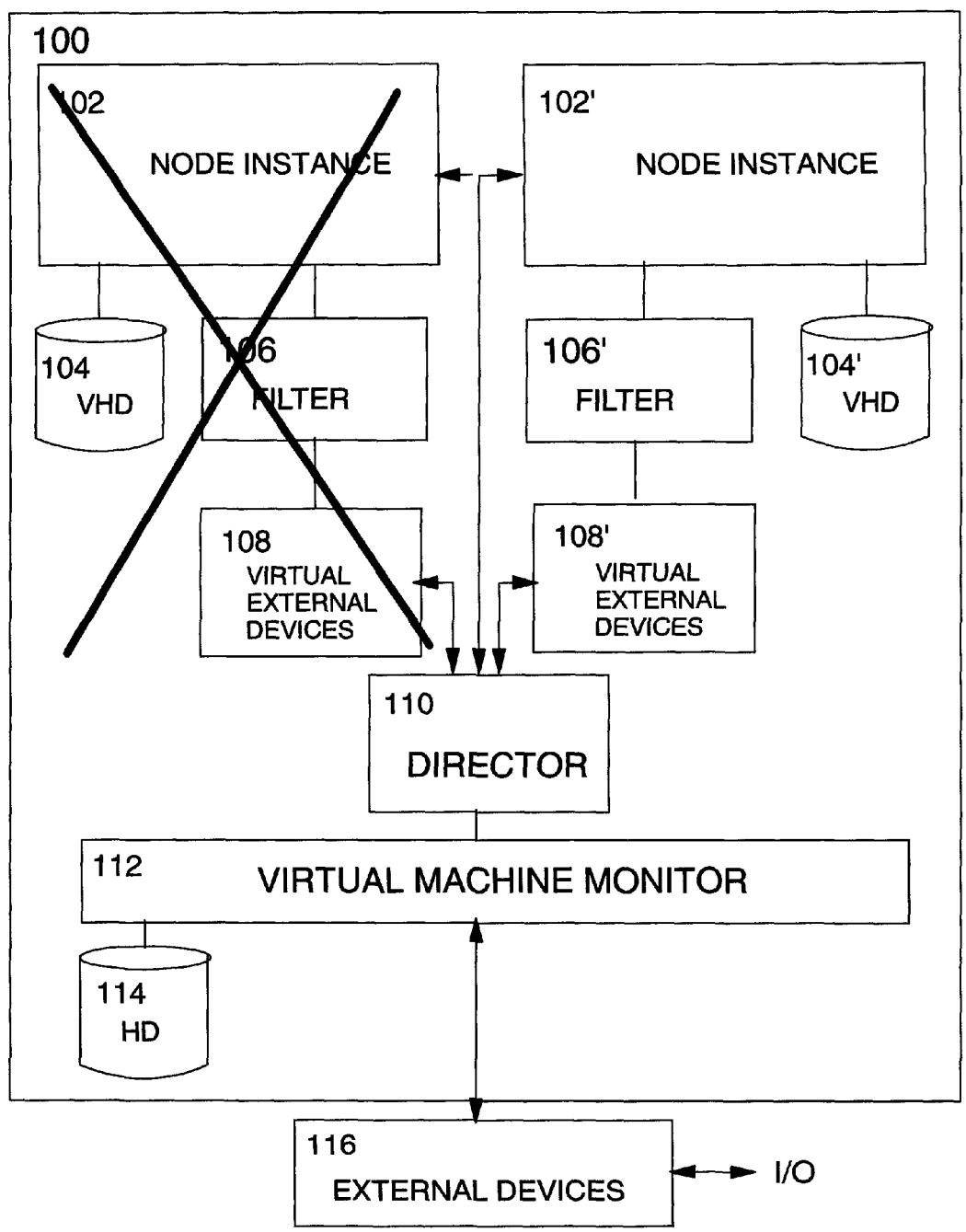

Once the second node instance 102' is fully operational the director 110 issues a commit which causes a change in the behaviour of both filters, as shown in FIG. 3. The first node instance 102 does not receive external signals any more; however, it can complete outstanding I/Os. The second node instance 102' is now fully operational using all virtual external devices and receiving and completing I/O. The director 110 monitors the outstanding I/Os to be completed by the first instance.

Figure 4:
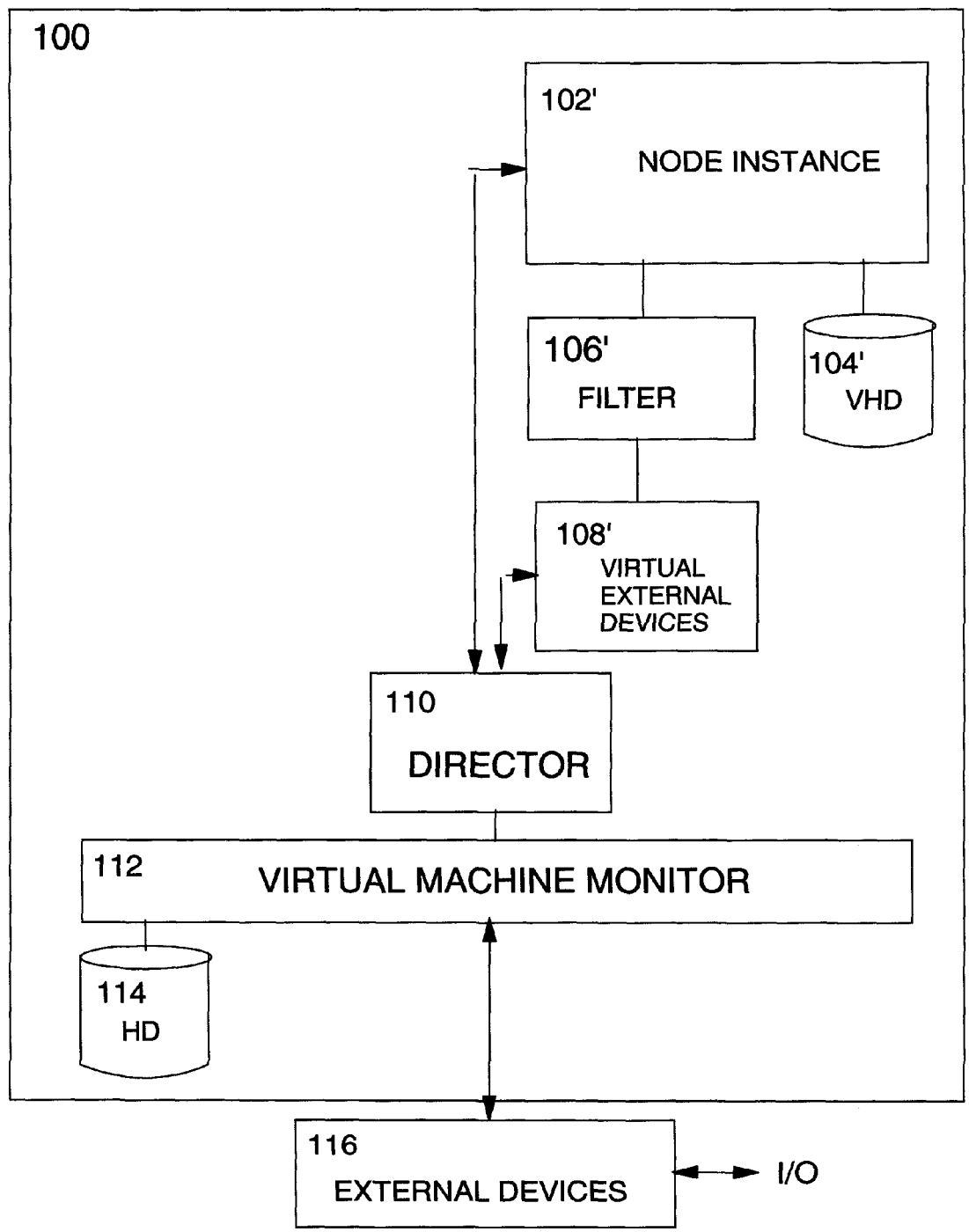

Once all I/O has completed from the first node instance 102 the director 110 initiates the deletion of the first instance, as shown in FIG. 4. All cluster activity then takes place under the control of node instance 102' and using its corresponding attached components 104', 106', 108' in place of node instance 102 and components 104, 106, 108.

The preferred embodiment of the present invention in the form of an apparatus thus advantageously addresses the problem of providing a technical framework for recovering from errors in high-availability clustered software.

Figure 5:
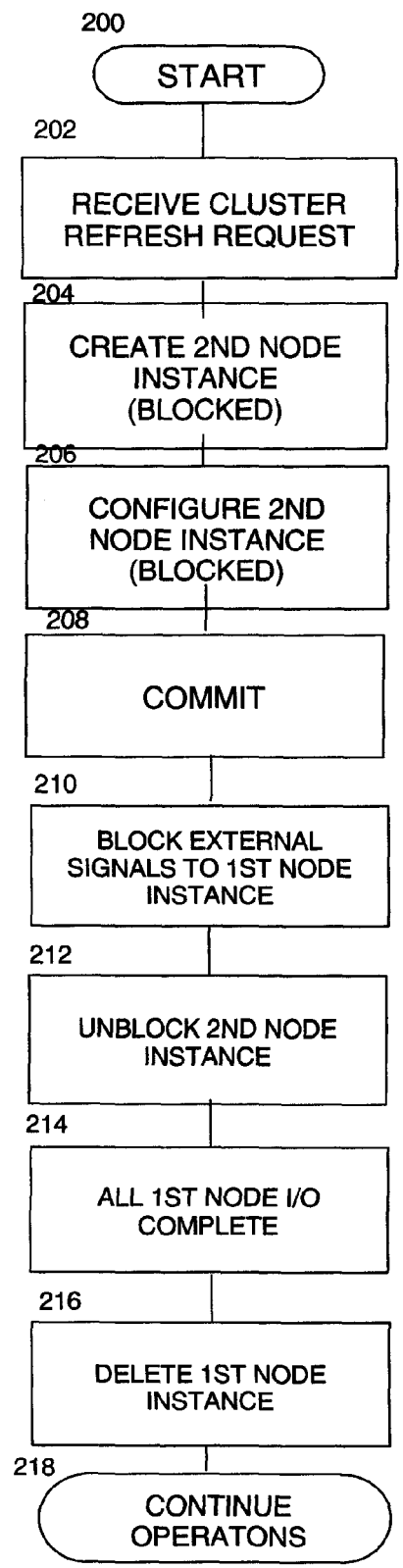
FIG. 5 shows in flowchart form one method or one logic arrangement in which a method of operation according to a preferred embodiment of the present invention may be implemented.

FIG. 5 shows, in flowchart form, a generalized process flow according to a preferred embodiment of the present invention.

At START step 200, a single node instance is operational in a normal mode of operating. At step 202, a cluster refresh request is received. At step 204, a second node instance is created, but is blocked from external signals. At step 206 the second node instance is configured as described above, using configuration data (but not state data) taken from the first node instance. When the configuration activity of step 206 is complete, a commit is issued at step 208. At step 210, the first node instance is blocked from external signals, and at step 212, I/O at the second node instance is unblocked. At step 214, all I/Os that were pending at the first node instance have completed, and at step 216, the first node instance is deleted. Operations continue at step 218.

Thus it can be seen that the replacement software in node instance 2 inherits the configuration data from node instance 1, but does not inherit any possibly faulty state data from node instance 1.

The following is a detailed description of one implementation of a node instance changeover procedure:
1. Flush the cache for all disks of node instance 102 (Flush cache on all storage virtualization nodes and change to cache-disabled mode for all vdisks/disable storage virtualization cache.)
2. Stop all configuration activity on node instance 102.
3. Copy Tier 3 metadata and configuration data of node instance 102 to the virtual hard disk of node instance 102'.
4. Create node instance 102' and use Tier 3 metadata and storage virtualization configuration backup data from the virtual hard disk to mirror configuration of instance 1.
5. All I/O continues to pass through node instance 102 until node instance 102' is fully operational.
6. Node instance 102' does not yet receive any I/O. Its cache remains empty, as does the cache of node instance 102.
7. Once node instance 102' is identical (in terms of its configuration and extent map, but not of its event history) to node instance 102, a commit takes place which switches to node instance 102'
8. Node instance 102' is removed.
9. The cache on node instance 102' is enabled.

It will be clear to one of ordinary skill in the art that the above description relates to a single entity in a cluster, and that the same process needs to be coordinated on all the nodes in the cluster. This is achieved through the director 110. Once all node instances 102' in the cluster are completely set up as described above, the node instances 102' notify all the directors 110 which then inform the corresponding node instances 102. In this way a controlled switch over can take place.

The preferred embodiment of the present invention in the form of a method or logic arrangement thus advantageously addresses the problem of providing a technical framework for recovering from errors in high-availability clustered software.

The preferred embodiment thus operates by activating virtualisation of the resources of all storage virtualization nodes using a virtualisation technology when a non-disruptive reinstall/refresh of the cluster state is requested. This allows two instances of storage virtualization software to run on the same storage virtualization node—the original version with possible inconsistencies in cluster state and a fresh version which has its cluster state reinitialised. The fresh version copies the minimum of data required from the original version in order to reproduce the original configuration with its extent map. Once the fresh versions of storage virtualization software are operational on all nodes, I/O is redirected to the fresh cluster without impacting host systems or storage subsystems. The original version is deleted once the switch is complete and virtualisation of the storage resources can be deactivated. In one example, a known virtualization technology such as Xen can be used, but it will be clear to one of ordinary skill in the art that other equivalent virtualization technologies are equally applicable.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the method.

It will be clear to one skilled in the art that many improvements and modifications can be made to the foregoing exemplary embodiment without departing from the scope of the present invention.

The invention claimed is:
1. A system, comprising:
a processor;
a non-transitory computer readable medium including:
a first virtual node comprising a first virtual machine;
a director in communication with the first virtual node, wherein the director is executed by the processor to perform operations, the operations comprising:
quiescing configuration activity at the first virtual node;
creating a second virtual node with Input/Output (I/O) access to the second virtual node blocked;

transferring configuration data from the first virtual node to the second virtual node;
committing a changeover from the first virtual node to the second virtual node;
blocking inbound communications to the first virtual node;
unblocking Input/Output (I/O) access at the second virtual node;
monitoring outbound communications from the first virtual node and signaling completion of all pending outbound communications; and
deleting the first virtual node in response to the first virtual node completing the pending outbound communications.

2. The system of claim 1, further comprising:
Input/Output (I/O) devices;
a virtual machine monitor coupled to the I/O devices, wherein the virtual machine monitor performs operations, the operations comprising:
virtualizing the I/O devices to make accessible to virtual nodes;
distributing Input/Output (I/O) requests to the virtual nodes;
receiving a request to refresh storage virtualization; and
initiating operations by the director to create the second virtual node.

3. The system of claim 1, further comprising:
a first virtual hard disk connected to the first virtual node;
a second virtual hard disk connected to the second virtual node;
wherein the director transfers the configuration data by transferring the configuration data for the first virtual node to the second virtual hard disk.

4. The system of claim 1, wherein the first virtual node includes a first cache and the second virtual node includes a second cache wherein the director further performs:
flushing the first cache and change the first cache to cache disabled mode for virtual storage.

5. The system of claim 1, wherein the second virtual node inherits configuration data from the first virtual node, but not state data.

6. The system of claim 1, wherein the committing of the changeover is performed in response to configuring the second node instance with the configuration data transferred from the first virtual node.

7. The system of claim 1, wherein the director further performs:
receiving indication that the second virtual node completed setting-up, wherein the commit operation is initiated in response to receiving the indication that the second virtual node completed setting-up.

8. The system of claim 1, wherein the creating of the second virtual node comprises creating a plurality of second virtual nodes, wherein the director further performs:
receiving, from the second virtual nodes, notification that the second virtual nodes have completed setting-up, wherein the director initiates the commit operation in response to receiving the set-up completed notification from all the second virtual nodes.

9. The system of claim 1, wherein the non-transitory computer readable medium further includes:
a first filter coupled to the first virtual node; and
a second filter coupled to the second virtual node, wherein the first filter defines a set of events that the first virtual node can send and receive and wherein the second filter defines a set of events that the second virtual node can send and receive, wherein the director interacts with the first and second filters to perform the commit operation.

10. A method, comprising:
quiescing configuration activity at a first virtual node comprising a first virtual machine;
creating a second virtual node with Input/Output (I/O) access to the second virtual node blocked;
transferring configuration data from the first virtual node to the second virtual node;
committing a changeover from the first virtual node to the second virtual node;
blocking inbound communications to the first virtual node;
unblocking Input/Output (I/O) access at the second virtual node;
monitoring outbound communications from the first virtual node and signaling completion of all pending outbound communications; and
deleting the first virtual node in response to the first virtual node completing the pending outbound communications.

11. The method of claim 10, further comprising:
virtualizing Input/Output (I/O) devices to make accessible to virtual nodes;
distributing Input/Output (I/O) requests to the virtual nodes;
receiving a request to refresh storage virtualization; and
initiating operations to create the second virtual node in response to receiving the request to refresh the storage virtualization.

12. The method of claim 10,
providing a first virtual hard disk connected to the first virtual node;
providing a second virtual hard disk connected to the second virtual node;
wherein transferring the configuration data comprising transferring the configuration data for the first virtual node to the second virtual hard disk.

13. The method of claim 10, wherein the inbound communications to the first virtual node are blocked in response to the second virtual node becoming fully operational.

14. The method of claim 10, wherein the first virtual node includes a first cache and the second virtual node includes a second cache, further comprising:
flushing the first cache and change the first cache to cache disabled mode for virtual storage.

15. The method of claim 10, wherein the second virtual node inherits configuration data from the first virtual node, but not state data.

16. The method of claim 10, wherein the committing of the changeover is performed in response to configuring the second node instance with the configuration data transferred from the first virtual node.

17. The method of claim 10, further comprising:
receiving indication that the second virtual node completed setting-up, wherein the commit operation is initiated in response to receiving the indication that the second virtual node completed setting-up.

18. The method of claim 10, wherein the creating of the second virtual node comprises creating a plurality of second virtual nodes, further comprising:
receiving, from the second virtual node, notification that the second virtual nodes have completed setting-up, wherein the commit operation is initiated in response to receiving the set-up completed notification from all the second virtual nodes.

19. The method of claim 10, further comprising:

providing a first filter coupled to the first virtual node and a second filter coupled to the second virtual node, wherein the first filter defines a set of events that the first virtual node can send and receive and wherein the second filter defines a set of events that the second virtual node can send and receive; and providing a director to perform or initiate the operations of the quiescing configuration activity, the creating the second virtual node, the transferring configuration data from the first virtual node to the second virtual node, the committing the changeover, the blocking inbound communications, the unblocking I/O access, the monitoring outbound communications, and the deleting the first virtual node in response to the first virtual node completing the pending outbound communications, wherein the director interacts with the first and second filters to perform the commit operation.

20. A non-transitory computer readable medium having software executed by a processor to perform operations, the operations comprising:

quiescing configuration activity at a first virtual node comprising a first virtual machine;

creating a second virtual node with Input/Output (I/O) access to the second virtual node blocked;

transferring configuration data from the first virtual node to the second virtual node;

committing a changeover from the first virtual node to the second virtual node;

blocking inbound communications to the first virtual node;

unblocking Input/Output (I/O) access at the second virtual node;

monitoring outbound communications from the first virtual node and signaling completion of all pending outbound communications; and deleting the first virtual node in response to the first virtual node completing the pending outbound communications.

21. The computer readable medium of claim 20, wherein the operations further comprise:

virtualizing Input/Output (I/O) devices to make accessible to virtual nodes;

distributing Input/Output (I/O) requests to the virtual nodes;

receiving a request to refresh storage virtualization; and initiating operations to create the second virtual node in response to receiving the request to refresh the storage virtualization.

22. The computer readable medium of claim 20, further comprising:

providing a first filter coupled to the first virtual node and a second filter coupled to the second virtual node, wherein the first filter defines a set of events that the first virtual node can send and receive and wherein the second filter defines a set of events that the second virtual node can send and receive; and providing a director to perform or initiate the operations of the quiescing configuration activity, the creating the second virtual node, the transferring configuration data from the first virtual node to the second virtual node, the committing the changeover, the blocking inbound communications, the unblocking I/O access, the monitoring outbound communications, and the deleting the first virtual node in response to the first virtual node completing the pending outbound communications, wherein the director interacts with the first and second filters to perform the commit operation.

* * * * *